United States Patent
Guthrie et al.

(10) Patent No.: US 10,380,031 B2
(45) Date of Patent: *Aug. 13, 2019

(54) ENSURING FORWARD PROGRESS FOR NESTED TRANSLATIONS IN A MEMORY MANAGEMENT UNIT

(71) Applicant: International Business Machines Corporation, Armonk, NY (US)

(72) Inventors: Guy L. Guthrie, Austin, TX (US); Jody B. Joyner, Austin, TX (US); Jon K. Kriegel, Rochester, MN (US); Bradley Nelson, Austin, TX (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/822,537

(22) Filed: Nov. 27, 2017

(65) Prior Publication Data

US 2019/0065399 A1   Feb. 28, 2019

Related U.S. Application Data

(63) Continuation of application No. 15/683,615, filed on Aug. 22, 2017.

(51) Int. Cl.
*G06F 12/00* (2006.01)
*G06F 13/00* (2006.01)
(Continued)

(52) U.S. Cl.
CPC ........ *G06F 12/1027* (2013.01); *G06F 9/3009* (2013.01); *G06F 9/30079* (2013.01); *G06F 12/1009* (2013.01)

(58) Field of Classification Search
CPC ............ G06F 12/1027; G06F 9/30079; G06F 9/3009; G06F 12/1009
(Continued)

(56) References Cited

U.S. PATENT DOCUMENTS 5,099,415 A * 3/1992 Osler .................. G06F 12/1027
711/207
5,375,214 A * 12/1994 Mirza ................. G06F 12/1027
711/207

(Continued)

OTHER PUBLICATIONS

Appendix P; List of IBM Patent or Applications Treated as Related, Nov. 27, 2017, 2 pages.

(Continued)

*Primary Examiner* — Sheng Jen Tsai
(74) *Attorney, Agent, or Firm* — Nathan M. Rau

(57) ABSTRACT

Ensuring forward progress for nested translations in a memory management unit (MMU) including receiving a plurality of nested translation requests, wherein each of the plurality of nested translation requests requires at least one congruence class lock; detecting, using a congruence class scoreboard, a collision of the plurality of nested translation requests based on the required congruence class locks; quiescing, in response to detecting the collision of the plurality of nested translation requests, a translation pipeline in the MMU including switching operation of the translation pipeline from a multi-thread mode to a single-thread mode and marking a first subset of the plurality of nested translation requests as high-priority nested translation requests; and servicing the high-priority nested translation requests through the translation pipeline in the single-thread mode.

7 Claims, 6 Drawing Sheets

(51) Int. Cl.
*G06F 12/1027* (2016.01)
*G06F 9/30* (2018.01)
*G06F 12/1009* (2016.01)

(58) Field of Classification Search
USPC .......................................................... 711/207
See application file for complete search history.

(56) References Cited

U.S. PATENT DOCUMENTS

| | | | | |
|---|---|---|---|---|
| 5,430,856 | A * | 7/1995 | Kinoshita | G06F 12/1027 711/209 |
| 5,563,987 | A * | 10/1996 | Scott | G06F 12/10 358/1.16 |
| 5,893,930 | A * | 4/1999 | Song | G06F 12/1027 711/205 |
| 6,735,746 | B2 * | 5/2004 | Thompson | G06F 11/263 714/33 |
| 7,617,379 | B2 * | 11/2009 | Hirano | G06F 12/1045 711/202 |
| 8,397,219 | B2 * | 3/2013 | Vick | G06F 12/1027 717/131 |
| 9,274,823 | B1 * | 3/2016 | Koryakin | G06F 9/45558 |
| 9,330,018 | B2 * | 5/2016 | Deutschle | G06F 12/1027 |
| 9,390,055 | B2 | 7/2016 | Warfield et al. | |
| 9,575,815 | B1 * | 2/2017 | Guthrie | G06F 9/524 |
| 9,772,945 | B1 * | 9/2017 | Frey | G06F 12/0837 |
| 9,785,557 | B1 * | 10/2017 | Frey | G06F 12/0837 |
| 2003/0225992 | A1 * | 12/2003 | Venkatrao | G06F 12/0802 711/202 |
| 2007/0283121 | A1 * | 12/2007 | Irish | G06F 12/1027 711/202 |
| 2013/0339623 | A1 * | 12/2013 | Ambroladze | G06F 12/0815 711/134 |
| 2014/0013060 | A1 * | 1/2014 | Frey | G06F 12/0813 711/146 |
| 2014/0040551 | A1 * | 2/2014 | Blainey | G06F 12/0833 711/122 |
| 2014/0040557 | A1 * | 2/2014 | Frey | G06F 12/084 711/130 |
| 2014/0047205 | A1 * | 2/2014 | Frey | G06F 3/0668 711/163 |
| 2015/0052313 | A1 * | 2/2015 | Ghai | G06F 9/467 711/136 |
| 2015/0052315 | A1 * | 2/2015 | Ghai | G06F 9/467 711/145 |
| 2015/0242251 | A1 * | 8/2015 | Guthrie | G06F 9/5033 711/137 |
| 2015/0331798 | A1 * | 11/2015 | Guthrie | G06F 12/08 711/122 |
| 2015/0356023 | A1 * | 12/2015 | Peter | G06F 12/1036 711/208 |
| 2015/0370613 | A1 * | 12/2015 | Cain, III | G06F 3/0622 711/150 |
| 2016/0062892 | A1 * | 3/2016 | Guthrie | G06F 12/0833 711/122 |
| 2016/0147556 | A1 * | 5/2016 | Hu | G06F 9/45558 718/1 |
| 2017/0004085 | A1 * | 1/2017 | Guthrie | G06F 12/0857 |
| 2017/0177421 | A1 * | 6/2017 | Guthrie | G06F 9/524 |
| 2017/0177422 | A1 * | 6/2017 | Guthrie | G06F 9/3834 |
| 2017/0177493 | A1 * | 6/2017 | Guthrie | G06F 12/10 |
| 2017/0177501 | A1 * | 6/2017 | Guthrie | G06F 12/1045 |
| 2018/0032443 | A1 * | 2/2018 | Kaplan | G06F 12/1027 |
| 2018/0032447 | A1 * | 2/2018 | Kaplan | G06F 12/1009 |
| 2018/0189190 | A1 * | 7/2018 | Kaplan | G06F 12/1009 |

OTHER PUBLICATIONS

Guthrie et al., *Ensuring Forward Progress For Nested Translations in A Memory Management Unit*, IBM, U.S. Appl. No. 15/683,615, filed Aug. 22, 2017, 25 pages.

\* cited by examiner

ENSURING FORWARD PROGRESS FOR NESTED TRANSLATIONS IN A MEMORY MANAGEMENT UNIT

CROSS-REFERENCE TO RELATED APPLICATION

This application is a continuation application of and claims priority from U.S. patent application Ser. No. 15/683,615, filed on Aug. 22, 2017.

BACKGROUND

Field of the Invention

The field of the invention is data processing, or, more specifically, methods, apparatus, and products for ensuring forward progress for nested translations in a memory management unit.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for ensuring forward progress for nested translations in a memory management unit (MMU) are disclosed in this specification. Ensuring forward progress for nested translations in a MMU includes receiving a plurality of nested translation requests, wherein each of the plurality of nested translation requests requires at least one congruence class lock; detecting, using a congruence class scoreboard, a collision of the plurality of nested translation requests based on the required congruence class locks; quiescing, in response to detecting the collision of the plurality of nested translation requests, a translation pipeline in the MMU including switching operation of the translation pipeline from a multi-thread mode to a single-thread mode and marking a first subset of the plurality of nested translation requests as high-priority nested translation requests; and servicing the high-priority nested translation requests through the translation pipeline in the single-thread mode.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
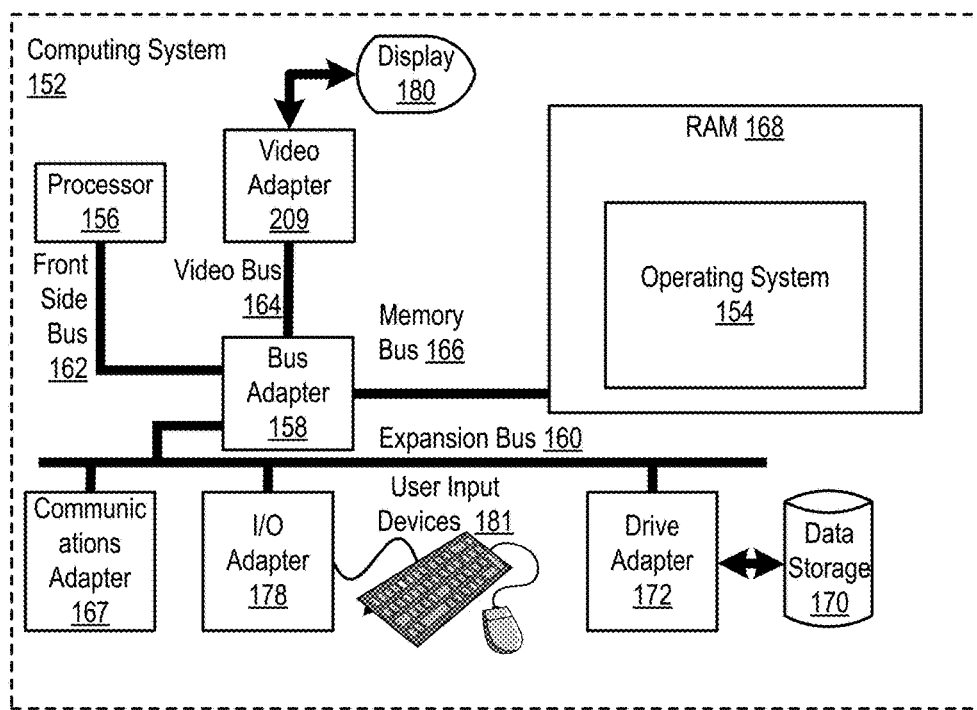
FIG. 1 sets forth a block diagram of an example system configured for ensuring forward progress for nested translations in a memory management unit (MMU) according to embodiments of the present invention.

Exemplary methods, apparatus, and products for ensuring forward progress for nested translations in a MMU in accordance with the present invention are described with reference to the accompanying drawings, beginning with FIG. 1. FIG. 1 sets forth a block diagram of automated computing machinery comprising an exemplary computing system (152) configured for ensuring forward progress for nested translations in a MMU according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152). The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets.

Although the processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the processor (156) may be coupled to other components of a computer system in a variety of configurations. For example, the processor (156) in some embodiments may include a memory controller configured for direct coupling to a memory bus (166). In some embodiments, the processor (156) may support direct peripheral connections, such as PCIe connections and the like.

Stored in RAM (168) is an operating system (154). Operating systems useful in computers configured for ensuring forward progress for nested translations in a MMU according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for ensuring forward progress for nested translations in a MMU according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for ensuring forward progress for nested translations in a MMU according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
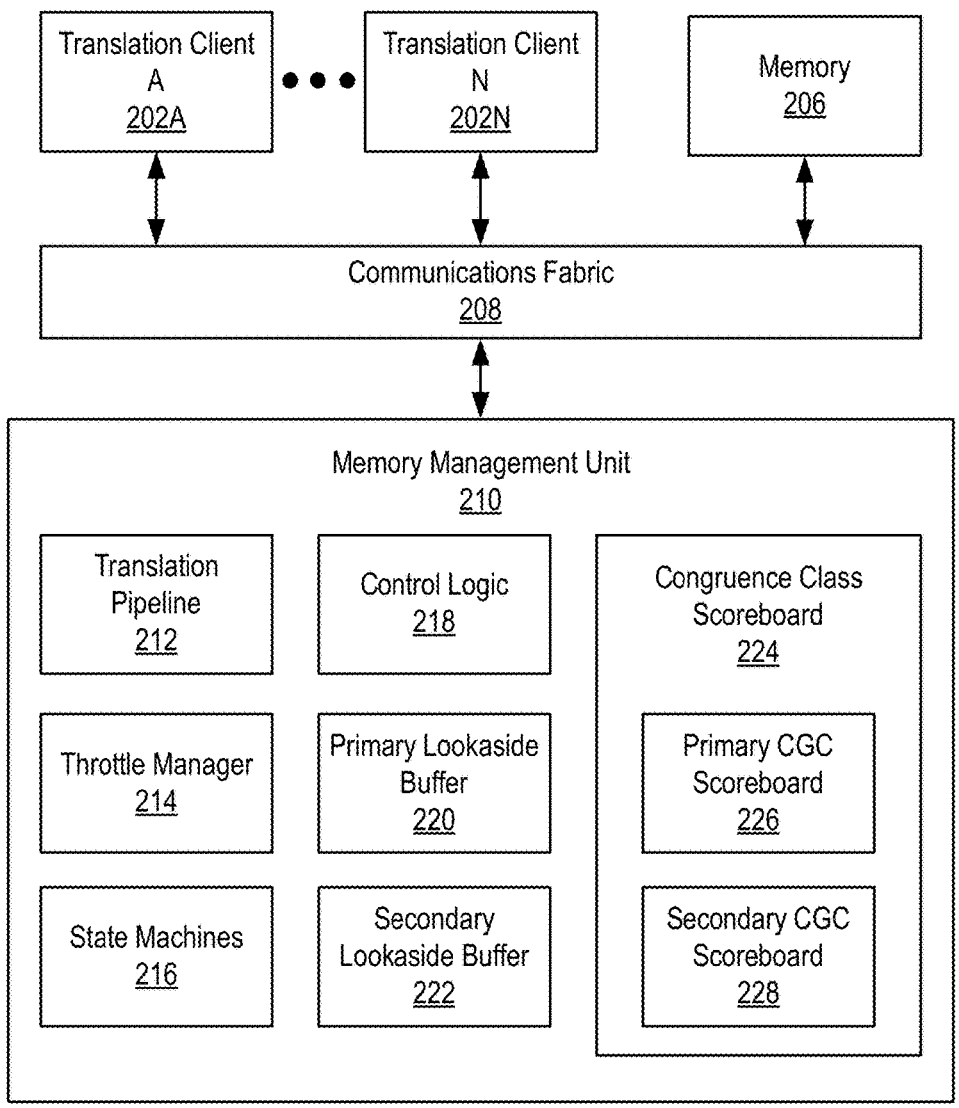
FIG. 2 sets forth a block diagram of an example system configured for ensuring forward progress for nested translations in a MMU according to embodiments of the present invention.

For further explanation, FIG. 2 sets forth an example block diagram of a system configured for ensuring forward progress for nested translations in a MMU according to embodiments of the present invention. As shown in FIG. 2, the system includes multiple translation clients (translation client A (202A), translation client N (202N)), memory (206), and a memory management unit (MMU) (210) communicatively coupled to a communications fabric (208). The MMU (210) includes a translation pipeline (212), throttle manager (214), state machines (216), control logic (218), a primary translation table (220), a secondary translation table (222), and a congruence class scoreboard (224) that includes a primary congruence class (CGC) scoreboard (226) and a secondary CGC scoreboard (228). Some or all of the elements shown in the system of FIG. 2 may exist within a processor, such as processor (156) as described in FIG. 1.

The translation clients (translation client A (202A), translation client N (202N)) are elements within the system that issue nested translation requests. A nested translation request is a message from a translation client (translation client A (202A), translation client N (202N)) to the MMU (210) that includes a memory address (e.g., an effective address or virtual address) for translation (e.g., into a real address or physical address). A nested translation request is nested in that the requested translation may require a two-step translation using the primary lookaside buffer (220) and the secondary lookaside buffer (222). For example, a nested translation may use a segment lookaside buffer to translate an effective address to a virtual address, and then use a translation lookaside buffer to translate the virtual address to a real address. Some nested translation requests require the use of only one lookaside buffer. The nested translation request may also include an associated priority, such as an indication that the nested translation request is high-priority. The translation clients (translation client A (202A), translation client N (202N)) may be processing cores, accelerators coupled to the processor, other elements on different nodes, etc. Other translation clients may exist within the MMU (210), such as the state machines (216).

The memory (206) is memory within the processor or external to the processor utilized by the translation clients (translation client A (202A), translation client N (202N)) on the processor. The memory (208) may include an embedded dynamic random access memory (eDRAM). The memory (208) may receive information and messages from the MMU (206), including table walk data requests and page table entry updates.

The MMU (210) is logic within the processor that translates one memory address (e.g., an effective address or virtual address) into another (e.g., into a real address or physical address). The MMU (210) performs table walks or other procedures to obtain a translation for a given address, and stores previously used translations in lookaside buffers (e.g., primary lookaside buffer (220), secondary lookaside buffer (222)).

The translation pipeline (212), or results pipeline, is logic within the MMU (210) that receives the nested translation requests and provides the response of the nested translation requests to the translation clients (translation client A (202A), translation client N (202N)). The translation pipeline (212) may respond to a nested translation request with, for example, a notification of completion with the translated address, a notification of failure, or a notification to resend the nested translation request as a high-priority nested translation request.

The throttle manager (214) is logic within the MMU (210) that monitors responses from the translation pipeline (212) for an indication to initiate a quiescing of the translation pipeline (212) and other elements on the MMU (210). The throttle manager (214) also monitors the pending nested translation requests and receives a notification from the other elements on the MMU (210) that all pending nested translation requests have resolved (i.e., completed, failed, or made high-priority).

The state machines (216) are logic within the MMU (210) that maintain the lookaside buffers (primary lookaside buffer (220) and the secondary lookaside buffer (222)) and generate nested translation requests in order to maintain the lookaside buffers (primary lookaside buffer (220) and the secondary lookaside buffer (222)). The state machines (216) may retrieve, modify, invalidate, or update entries in the lookaside buffers (primary lookaside buffer (220) and the secondary lookaside buffer (222)).

The primary lookaside buffer (220) and the secondary lookaside buffer (222) are data structures that cache address translations. For example, a hash page table implementation may incorporate a segment lookaside buffer and a translation lookaside buffer as the primary lookaside buffer (220) and the secondary lookaside buffer (222). A radix implementation may incorporate a global translation lookaside buffer and a local translation lookaside buffer as the primary lookaside buffer (220) and the secondary lookaside buffer (222).

The CGC scoreboards (224) (primary CGC scoreboard (226), secondary CGC scoreboard (228)) are data structures in the MMU (210) that track CGC owners and CGC reservations. A CGC is a portion of a lookaside buffer that may be used exclusively by the current owner (i.e., a process working on behalf of a nested translation request) of that CGC. The current owner is given a CGC lock on the CGC during which the owner has exclusive use of the CGC. Once the owner request has completed the process using the CGC, the CGC lock is released and given to the next nested translation request in the CGC scoreboard. The CGCs may be implemented as linked lists with the head of the link list as the owner of the CGC and the remaining members of the link list as nested translation requests with reservations on the CGC (provided on a first-come, first served basis). A process working on behalf of a nested translation request may require a CGC lock on the relevant CGCs in both the primary lookaside buffer (220) and the secondary lookaside buffer (222) in order to service the nested translation request.

The control logic (218) is logic within the MMU (210) that monitors the CGC scoreboards (224) for collisions. The control logic (218) compares the CGC locks and CGC reservations for each CGC for both the primary lookaside buffer (220) and the secondary lookaside buffer (222) to determine whether a collision has occurred or will likely occur. For example, a first nested translation request may require an entry in CGC A of the primary lookaside buffer (220) and an entry in CGC B of the secondary lookaside buffer (222) to complete the translation. A second nested translation may also require an entry in CGC A of the primary lookaside buffer (220) and an entry in CGC B of the secondary lookaside buffer (222) to complete the translation. A collision may occur if the first nested translation request has ownership of CGC A and is waiting for ownership of CGC B, and the second nested translation request has ownership of CGC B and is waiting for ownership of CGC A.

Figure 3:
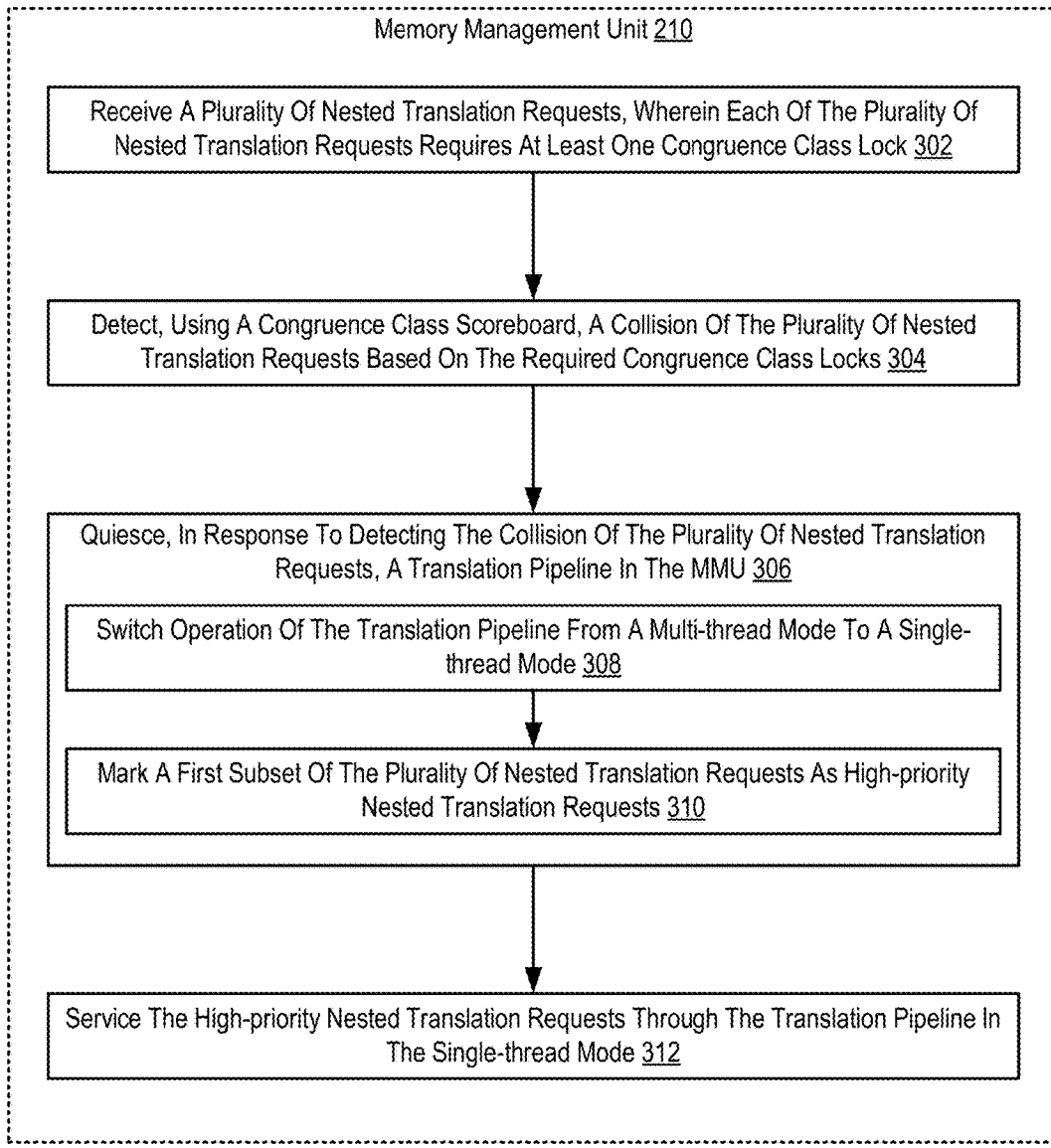
FIG. 3 sets forth a flow chart illustrating an exemplary method for ensuring forward progress for nested translations in a MMU according to embodiments of the present invention.

For further explanation, FIG. 3 sets forth a flow chart illustrating an exemplary method for ensuring forward progress for nested translations in a MMU according to embodiments of the present invention that includes receiving (302) a plurality of nested translation requests, wherein each of the plurality of nested translation requests requires at least one congruence class lock. Receiving (302) a plurality of nested translation requests, wherein each of the plurality of nested translation requests requires at least one congruence class lock may be carried out by a translation pipeline within the MMU (210) receiving a group of nested translation requests. Once the nested translation requests have been received, the MMU (210) may determine which CGC locks are required. The MMU (210) may then generate reservations in the CGC scoreboard for the nested translation requests.

The method of FIG. 3 further includes detecting (304), using a congruence class scoreboard, a collision of the plurality of nested translation requests based on the required congruence class locks. Detecting (304), using a congruence class scoreboard, a collision of the plurality of nested translation requests based on the required congruence class locks may be carried out by periodically inspecting or monitoring the CGC scoreboard to determine whether a collision condition currently exists or is anticipated to exist. A collision or collision condition is a state of the CGC scoreboard in which the CGC scoreboard cannot make forward progress with regard to at least one CGC. For example, a collision may occur when a process acting on behalf of a nested translation request obtains, or will obtain, a lock on a CGC but cannot complete (e.g., obtain a second necessary CGC lock, perform the translation, and release both CGC locks).

The method of FIG. 3 further includes quiescing (306), in response to detecting the collision of the plurality of nested translation requests, a translation pipeline in the MMU (210). Quiescing (306) the translation pipeline in the MMU (210) may be carried out by elements within in the MMU (210) resolving the pending nested translation requests. Resolving the pending nested translation requests may include notifying the translation client that the nested translation request has failed, instructing the translation client that the nested translation request should be resent as a high-priority nested translation request, and servicing the nested translation request by sending the address translation to the translation client.

Quiescing (306), in response to detecting the collision of the plurality of nested translation requests, a translation pipeline in the MMU (210) includes switching (308) operation of the translation pipeline from a multi-thread mode to a single-thread mode and marking (310) a first subset of the plurality of nested translation requests as high-priority nested translation requests.

Switching (308) operation of the translation pipeline from a multi-thread mode to a single-thread mode may be carried out by the MMU (210) ceasing multi-thread mode and initiating the single-thread mode.

Multi-thread mode is an operational mode in which multiple processes acting on behalf of nested translation requests are given simultaneous access to CGCs of the lookaside buffers, with individual CGCs using the CGC scoreboard for access control. Single-thread mode is an operational mode in which only a single process acting on behalf of a nested translation request is granted access to the required lookaside buffers at a given time.

Marking (310) a first subset of the plurality of nested translation requests as high-priority nested translation requests may be carried out by determining that a first nested transition request of the plurality of nested translation requests has obtained a congruence class lock on a congruence class; releasing the congruence class lock obtained by the first nested translation request; and marking the first nested translation request as a high priority nested translation request, including instructing a source (i.e., a translation client) of each of the subset of nested translation request to resend the nested translation request as a high-priority nested translation request.

The method of FIG. 3 further includes servicing (312) the high-priority nested translation requests through the translation pipeline in the single-thread mode. Servicing (312) the high-priority nested translation requests through the translation pipeline in the single-thread mode may be carried out by receiving a high-priority nested translation and providing the high-priority nested translation exclusive access to the required lookaside buffers to complete the translation. Once the translation is complete, the translation pipeline may send the translation back to the source (i.e., the translation client).

Figure 4:
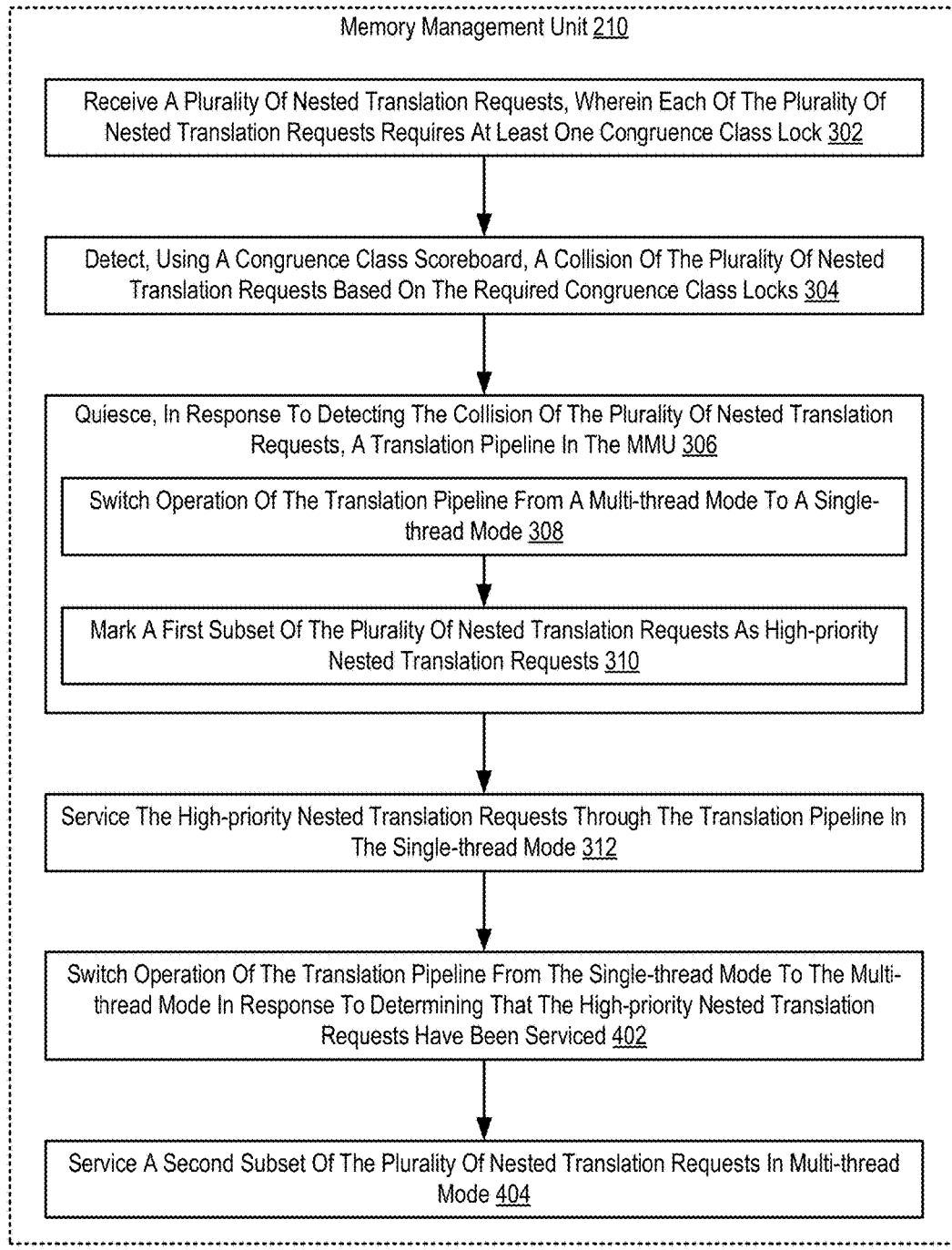
FIG. 4 sets forth a flow chart illustrating an exemplary method for ensuring forward progress for nested translations in a MMU according to embodiments of the present invention.

For further explanation, FIG. 4 sets forth a flow chart illustrating a further exemplary method for ensuring forward progress for nested translations in a MMU according to embodiments of the present invention that includes receiving (302) a plurality of nested translation requests, wherein each of the plurality of nested translation requests requires at least one congruence class lock; detecting (304), using a congruence class scoreboard, a collision of the plurality of nested translation requests based on the required congruence class locks; quiescing (306), in response to detecting the collision of the plurality of nested translation requests, a translation pipeline in the MMU (210) including switching (308) operation of the translation pipeline from a multi-thread mode to a single-thread mode and marking (310) a first subset of the plurality of nested translation requests as high-priority nested translation requests; and servicing (312) the high-priority nested translation requests through the translation pipeline in the single-thread mode.

The method of FIG. 4 differs from the method of FIG. 3, however, in that the method of FIG. 4 further includes switching (402) operation of the translation pipeline from the single-thread mode to the multi-thread mode in response to determining that the high-priority nested translation requests have been serviced; and servicing (404) a second subset of the plurality of nested translation requests in multi-thread mode.

Switching (402) operation of the translation pipeline from the single-thread mode to the multi-thread mode in response to determining that the high-priority nested translation requests have been serviced may be carried out by the MMU (210) ceasing single-thread mode and reinitiating the multi-thread mode. Determining that the high-priority nested translation requests have been serviced may be carried out by the translation pipeline inspecting the received and queued nested translation requests for nested translation requests that are marked as high-priority nested translation requests. If there are no high-priority nested translation requests left (e.g., remaining in a receive queue), then the pending high-priority nested translation requests have each been serviced.

Servicing (404) a second subset of the plurality of nested translation requests in multi-thread mode may be carried out by accepting nested translation requests that are not marked high-priority in the translation pipeline. Received nested translation requests may then be processed in multi-thread mode in which multiple processes acting on behalf of nested translation requests are given simultaneous access to CGCs.

Figure 5:
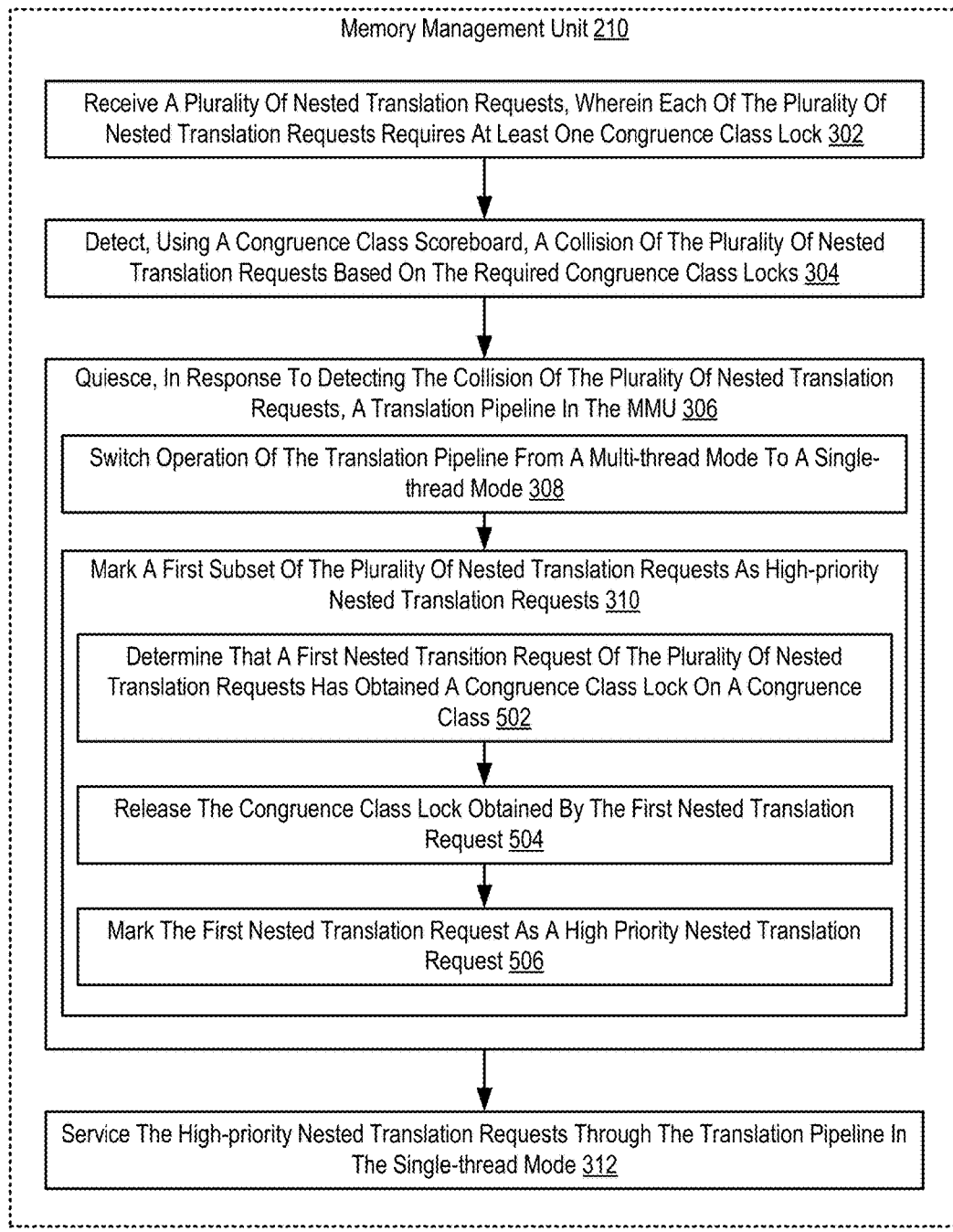
FIG. 5 sets forth a flow chart illustrating an exemplary method for ensuring forward progress for nested translations in a MMU according to embodiments of the present invention.

For further explanation, FIG. 5 sets forth a flow chart illustrating a further exemplary method for ensuring forward progress for nested translations in a MMU according to embodiments of the present invention that includes receiving (302) a plurality of nested translation requests, wherein each of the plurality of nested translation requests requires at least one congruence class lock; detecting (304), using a congruence class scoreboard, a collision of the plurality of nested translation requests based on the required congruence class locks; quiescing (306), in response to detecting the collision of the plurality of nested translation requests, a translation pipeline in the MMU (210) including switching (308) operation of the translation pipeline from a multi-thread mode to a single-thread mode and marking (310) a first subset of the plurality of nested translation requests as high-priority nested translation requests; and servicing (312) the high-priority nested translation requests through the translation pipeline in the single-thread mode.

The method of FIG. 5 differs from the method of FIG. 3, however, in that marking (310) a first subset of the plurality of nested translation requests as high-priority nested translation requests includes determining (502) that a first nested transition request of the plurality of nested translation requests has obtained a congruence class lock on a congruence class; releasing (504) the congruence class lock obtained by the first nested translation request; and marking (506) the first nested translation request as a high priority nested translation request.

Determining (502) that a first nested transition request of the plurality of nested translation requests has obtained a congruence class lock on a congruence class may be carried out by inspecting the CGC scoreboard to determine which of the nested translation requests has obtained a CGC lock. Releasing (504) the congruence class lock obtained by the first nested translation request may be carried out by altering the data structure used to store the CGC scoreboard. The CGC locks obtained by the nested translation requests are released, but the nested translation requests that have obtained a CGC lock at the time of the quiescing are marked high-priority.

Marking (506) the first nested translation request as a high priority nested translation request may be carried out by instructing, via the translation pipeline, the source of the nested translation request to resend the nested translation request as a high-priority nested translation request. Marking (506) the first nested translation request as a high priority nested translation request may also be carried out by reinserting the nested translation request into a receive queue with a high-priority indicator.

Figure 6:
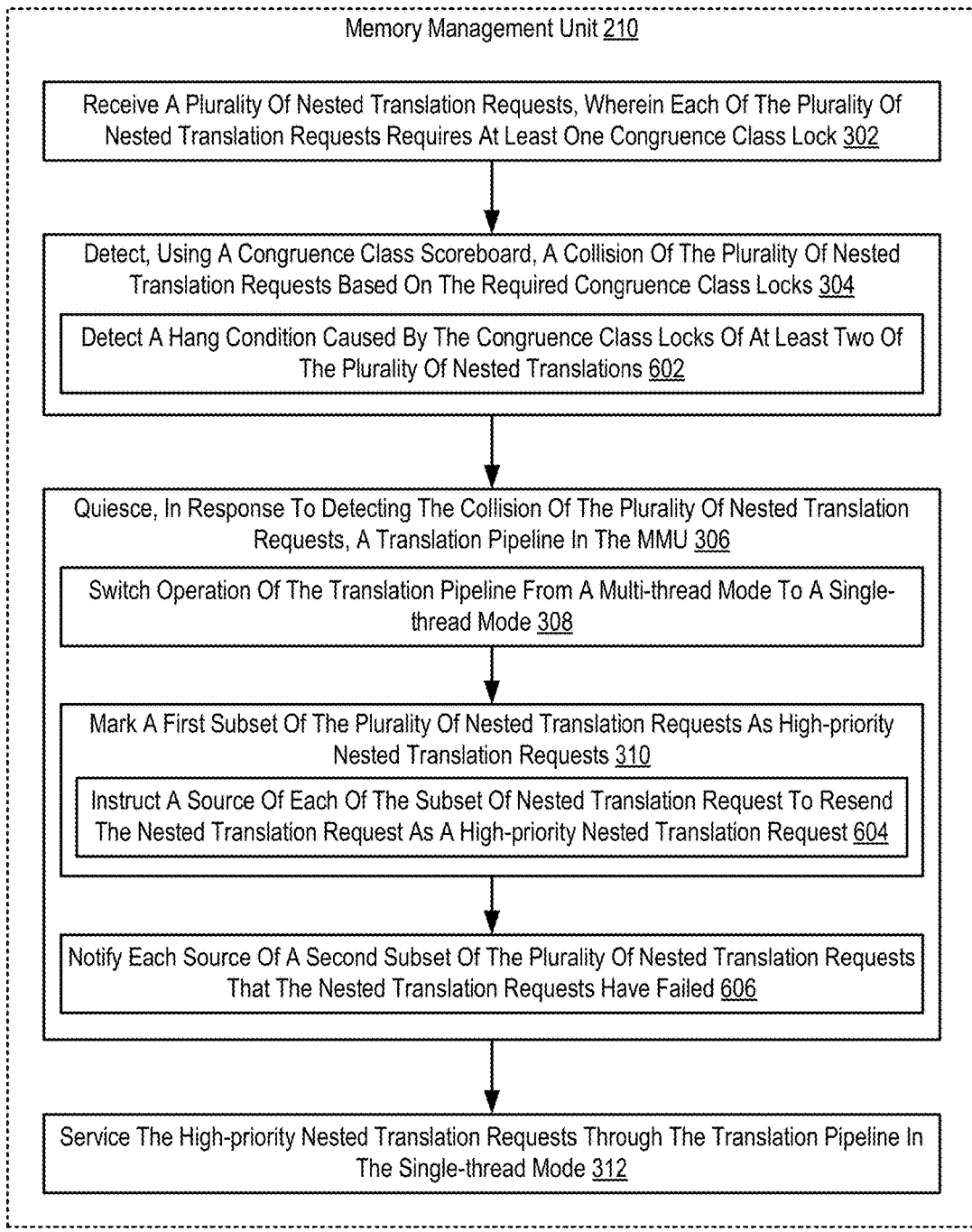
FIG. 6 sets forth a flow chart illustrating an exemplary method for ensuring forward progress for nested translations in a MMU according to embodiments of the present invention.

For further explanation, FIG. 6 sets forth a flow chart illustrating a further exemplary method for ensuring forward progress for nested translations in a MMU according to embodiments of the present invention that includes receiving (302) a plurality of nested translation requests, wherein each of the plurality of nested translation requests requires at least one congruence class lock; detecting (304), using a congruence class scoreboard, a collision of the plurality of nested translation requests based on the required congruence class locks; quiescing (306), in response to detecting the collision of the plurality of nested translation requests, a translation pipeline in the MMU (210) including switching (308) operation of the translation pipeline from a multi-thread mode to a single-thread mode and marking (310) a first subset of the plurality of nested translation requests as high-priority nested translation requests; and servicing (312) the high-priority nested translation requests through the translation pipeline in the single-thread mode.

The method of FIG. 6 differs from the method of FIG. 3, however, in that detecting (304), using a congruence class scoreboard, a collision of the plurality of nested translation requests based on the required congruence class locks includes detecting (602) a hang condition caused by the congruence class locks of at least two of the plurality of nested translations. Detecting (602) a hang condition caused by the congruence class locks of at least two of the plurality of nested translations may be carried out by inspecting the CGC scoreboard for at least two nested translation requests, each with CGC locks, that are dependent upon each other completing. A hang condition is a state of the CGC scoreboard in which forward progress is prevented by at least two processes, working on behalf of nested translation requests, that cannot complete before the other process or processes complete.

The method of FIG. 6 also differs from the method of FIG. 3, however, in that marking (310) a first subset of the plurality of nested translation requests as high-priority nested translation requests includes instructing (604) a source of each of the subset of nested translation request to resend the nested translation request as a high-priority nested translation request. Instructing (604) a source of each of the subset of nested translation request to resend the nested translation request as a high-priority nested translation request may be carried out by sending a response to the source (i.e., the translation client) of each of the nested translation requests with instructions to reinitiate the nested translation request as a high-priority nested translation request. In response, the translation clients may resend the nested translation requests as high-priority nested translation requests.

The method of FIG. 6 also differs from the method of FIG. 3, however, in that quiescing (306) a translation pipeline in the MMU (210) includes notifying (606) each source of a second subset of the plurality of nested translation requests that the nested translation requests have failed. Notifying (606) each source of a second subset of the plurality of nested translation requests that the nested translation requests have failed may be carried out by sending a response to the source (i.e., the translation client) of each of the nested translation requests with notification that the nested translation request has failed and should be resent. In response, the translation clients may resend the nested translation requests after a predetermined delay.

In view of the explanations set forth above, readers will recognize that the benefits of ensuring forward progress for nested translations in a MMU according to embodiments of the present invention include:

Improving the operation of a computing system by resolving collisions that prevent forward progress in an MMU, increasing computing system reliability.

Improving the operation of a computing system by allowing higher MMU servicing throughput while reducing MMU hangs, increasing computing system functionality.

Exemplary embodiments of the present invention are described largely in the context of a fully functional computer system for ensuring forward progress for nested translations in a MMU. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art.

Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for ensuring forward progress for nested translations in a memory management unit (MMU) comprising:
   receiving a plurality of nested translation requests, wherein each of the plurality of nested translation requests requires at least one congruence class lock indicating an exclusive use of a congruence class comprising a portion of a lookaside buffer, and wherein translation of each of the plurality of translation requests requires a primary translation table and a second translation table;
   detecting, using a congruence class scoreboard tracking congruence class locks and congruence class reservations, a collision of the plurality of nested translation requests, wherein the collision comprises a state in which one or more of the nested translation requests cannot proceed due to the required congruence class locks;
   quiescing, in response to detecting the collision of the plurality of nested translation requests, a translation pipeline in the MMU including switching operation of the translation pipeline from a multi-thread mode to a single-thread mode and marking a first subset of the plurality of nested translation requests as high-priority nested translation requests; and
   servicing the high-priority nested translation requests through the translation pipeline in the single-thread mode.

2. The method of claim 1, further comprising:
   switching operation of the translation pipeline from the single-thread mode to the multi-thread mode in response to determining that the high-priority nested translation requests have been serviced; and
   servicing a second subset of the plurality of nested translation requests in multi-thread mode.

3. The method of claim 1, wherein marking the subset of the plurality of nested translation request as high priority nested translation requests comprises:
   determining that a first nested transition request of the plurality of nested translation requests has obtained a congruence class lock on a congruence class;
   releasing the congruence class lock obtained by the first nested translation request; and
   marking the first nested translation request as a high priority nested translation request.

4. The method of claim 1, wherein the congruence class scoreboard comprises a primary congruence class scoreboard and a secondary congruence class scoreboard, wherein the primary congruence class scoreboard is a data structure that tracks congruence class reservations and congruence class locks for the primary translation table, and wherein the secondary congruence class scoreboard is a data structure that tracks congruence class reservations and congruence class locks for the second translation table.

5. The method of claim 1, wherein detecting the collision of the plurality of nested translation requests comprises detecting a hang condition caused by the congruence class locks of at least two of the plurality of nested translations.

6. The method of claim 1, wherein quiescing the translation pipeline in the MMU further comprises notifying each source of a second subset of the plurality of nested translation requests that the nested translation requests have failed.

7. The method of claim 1, wherein marking the subset of the plurality of nested translation request as high priority nested translation requests comprises instructing a source of each of the subset of nested translation request to resend the nested translation request as a high-priority nested translation request.

* * * * *